United States Patent [19]

Chrysler

[11] Patent Number: 5,038,925
[45] Date of Patent: Aug. 13, 1991

[54] CONVEYOR FOR TRANSPORTING ARTICLES ALONG A CURVED PATH

[75] Inventor: Rodman W. Chrysler, Syosset, N.Y.

[73] Assignee: PSC Floturn, Inc., Hillside, N.J.

[21] Appl. No.: 511,585

[22] Filed: Apr. 20, 1990

[51] Int. Cl.⁵ .............................................. B65G 15/02
[52] U.S. Cl. ................................... 198/831; 198/838; 198/845
[58] Field of Search ............... 198/831, 838, 845, 778; 193/37

[56] References Cited

U.S. PATENT DOCUMENTS

| | | | |
|---|---|---|---|
| 2,234,537 | 3/1941 | Blackburn | 198/831 |
| 2,526,563 | 10/1950 | Keen . | |
| 2,990,052 | 6/1961 | Stille et al. . | |
| 3,044,603 | 7/1962 | Fry . | |
| 3,217,861 | 11/1965 | Daniluk et al. | 198/831 X |
| 3,237,756 | 3/1966 | Pulver | 198/831 X |
| 3,838,767 | 10/1974 | Taylor . | |
| 3,854,575 | 12/1974 | Fraioli, Sr. . | |
| 3,901,379 | 8/1975 | Bruhm . | |
| 3,934,708 | 1/1976 | Kambara . | |
| 3,951,256 | 4/1976 | Gurewitz . | |
| 4,202,443 | 5/1980 | Buhrer . | |
| 4,372,435 | 2/1983 | Bradbury | 193/37 X |
| 4,380,288 | 4/1983 | Bodimer et al. . | |
| 4,422,544 | 12/1983 | Alldredge . | |
| 4,440,294 | 4/1984 | Langen | 198/838 |
| 4,846,338 | 7/1989 | Widmer . | |

FOREIGN PATENT DOCUMENTS

| | | | |
|---|---|---|---|
| 0098227 | 1/1984 | European Pat. Off. | 198/831 |
| 1068178 | 10/1959 | Fed. Rep. of Germany | 198/838 |
| 3421413 | 12/1985 | Fed. Rep. of Germany | 198/831 |
| 2323602 | 4/1977 | France | 198/838 |
| 0042508 | 3/1983 | Japan | 198/831 |
| 1379916 | 1/1975 | United Kingdom | 198/838 |

*Primary Examiner*—D. Glenn Dayoan
*Attorney, Agent, or Firm*—Lerner, David, Littenberg, Krumholz & Mentlik

[57] ABSTRACT

A conveyor in the nature of a powered belt turn for transporting articles along a curved path is disclosed. The known tendency of curved belt conveyors to drift radially is prevented by a unique guide assembly which is designed so as not to interfere with the useable surface area of the conveyor belt for transporting articles therealong. The guide assembly is designed to include a pair of guide rollers rotationally supported about a common axis for engagement with a pair of spaced apart guide rails.

19 Claims, 3 Drawing Sheets

CONVEYOR FOR TRANSPORTING ARTICLES ALONG A CURVED PATH

BACKGROUND OF THE INVENTION

The present invention relates in general to a conveyor for transporting articles over a predetermined distance and path, and more particularly, to a conveyor commonly referred to as a powered belt turn for transporting articles along a curved path which includes a counterbalance guide assembly to prevent the radial-inward displacement or drifting of the conveyor belt during use.

A variety of conveyor systems are known for transporting various articles, such as packages, crates and the like from one location to another in manufacturing and other distribution operations. These conveyor systems include straight sections or curved sections where the conveyor system changes direction, as well as article raising and lowering sections. Curved conveyor sections can be inexpensively constructed from a plurality of rotatable rollers which support the article being conveyed, such as known from U.S. Pat. No. 2,990,052. One disadvantage in using roller type conveyors about a curved section is the inability of the conveyor to maintain a predetermined orientation of the article as it advances along the curved section. This results from the article sliding along the rollers in a manner which causes the article to twist and turn as it is being advanced. As a result, the article frequently reaches its final destination in an orientation which is not proper for the manufacturing or other distribution operation to be performed.

In solving this orientation problem, it is known to use power driven endless belt conveyors about curved sections. The power driven feature of these conveyors also has the additional advantage of conveying articles which are relatively heavy, and which might otherwise stop or slow down on the aforedescribed roller type conveyor systems. This is particularly important in conveyor systems where the articles must be conveyed at a uniform rate of linear speed through various straight and curved sections.

Presently, known power driven curved conveyors utilize various devices for maintaining the curved conveyor belt in proper position while it is being advanced around the curved path. In this regard, it is known that the endless belt has a tendency to drift radially inward while being advanced. Known devices for maintaining the proper orientation of the endless belt include the use of guide chains mounted on one or both sides of the conveyor belt such as disclosed in U.S. Pat. No. 3,854,575. In other known arrangements, U.S. Pat. No. 3,044,603 includes a drive chain along the outer curved edge of the conveyor belt and is formed with spaced apart upstanding tongues which overlap and are secured to the outer edge of the belt. U.S. Pat. No. 3,901,379 discloses an arrangement in which the outer edge of the conveyor belt is provided with a bead which is guided between a pair of rollers. The axis of the rollers are arranged at an angle to one another in a manner such that the bead is compressed to prevent radial-inward drifting of the belt.

U.S. Pat. Nos. 4,846,338 and 4,202,443 disclose an arrangement in which the outer edge of the conveyor belt is attached to a peripheral drive chain by means of a bracket which supports a roller which is in contact with a guide rail. U.S. Pat. No. 3,951,256 discloses an arrangement which includes a series of rollers arranged on transverse axes attached directly to the underside of the conveyor belt and which are adapted to ride in separate transversely arranged guide channels on a conveyor support frame. These known guide devices and arrangements are relatively complicated in construction, resulting in increased cost of manufacture, as well as anticipated rapid wear requiring frequent adjustment or component replacement.

There is also known from FIG. 1 an arrangement which includes an endless conveyor belt 100 which is supported by a slider bed 102. A plurality of C-shaped brackets 104 are attached about the outer edge of the conveyor belt 102. The free ends of the C-shaped bracket 104 rotational support a pair of oppositely facing rollers 106 which engage a pair of guide rails 108 arranged on either side of the conveyor belt 100. A stationary cover 110 is mounted so as to enclose the upper portion of the C-shaped bracket 104 to prevent possible damage to the arrangement or injury to individuals. This arrangement is undesirable in that the C-shaped bracket 104 and cover 110 extend above the surface of the conveyor belt 100 which will interfere with the transporting of articles whose dimensions might exceed the width of the conveyor belt. This effectively limits the size of the articles which a given conveyor system will be capable of handling.

SUMMARY OF THE INVENTION

One object of the present invention is to provide a conveyor which presents a flat, horizontal carrying surface that is adapted to change direction as it moves along its course to thereby turn the direction of movement of articles carried thereon.

Another object of the invention is to provide a conveyor which includes improved means for suspending the conveyor belt to permits its movement along a curved path and about power driven rollers without any radial-inward shifting of the belt, as well as, without warping, buckling or creasing of the carrying surface of the belt.

Another object of the invention is to provide a conveyor which may be powered by conventional drive means, and which is of low cost, rugged and durable construction.

In accordance with one embodiment of the present invention, there is provided a device for transporting articles along a curved path, the device constructed of a conveyor belt arranged for travel over a curved path; a frame including spaced apart first and second guide rails; and a plurality of guide assemblies attached in spaced apart relationship to the conveyor belt and extending between the first and second guide rails, the guide assemblies including a first guide roller arranged for contact with the first guide rail and a second guide roller arranged for contact with the second guide rail, and support means for rotational supporting the first and second guide rollers for rotation about a common axis.

In accordance with another embodiment of the present invention, there is disclosed a device for transporting articles along a curved path, the device constructed of an endless conveyor belt arranged for travel over a curved path, the conveyor belt having a curved inner edge and a curved outer edge, the outer edge having a length greater than the length of the inner edge; a frame arranged adjacent the outer edge of the conveyor belt, the frame including a first guide rail and a second guide rail horizontally and vertically offset from the first guard rail; a plurality of guide assemblies attached in spaced apart relationship along the curved outer edge of the conveyor belt and extending vertically between the first and second guide rails, the guide assemblies including a first guide roller arranged for contact with the first guide rail and a second guide roller arranged for contact with the second guide rail, and support means for rotational supporting the first and second guide rollers for rotation about a common axis arranged substantially transverse to the conveyor belt.

In accordance with another embodiment of the present invention, there is disclosed a device for transporting articles along a curved path, the device constructed of an endless conveyor belt arranged in the form of a loop having an upper portion for conveying articles along a horizontal curved path and an underlying lower portion, the conveyor belt having a curved inner edge and a curved outer edge, the outer edge having a length greater than the length of the inner edge, means for advancing the upper portion of the conveyor belt along the curved path; a frame arranged adjacent the outer edge of the conveyor belt, the frame including an upper pair of guide rails arranged adjacent the upper portion of the conveyor belt between the upper and lower portions thereof and a lower pair of guide rails arranged adjacent the lower portion of the conveyor belt between the upper and lower portions thereof, the upper pair of guide rails including a first guide rail and a second guide rail horizontally and vertically offset from the first guide rail, the lower pair of guide rails including a third guide rail and a fourth guide rail horizontally and vertically offset from the third guide rail; and a plurality of guide assemblies attached in spaced apart relationship along the curved outer edge of the conveyor belt and alternately extending between the upper and lower pair of guide rails upon advancement of the conveyor belt, the guide assemblies including a first guide roller arranged for alternate contact with the first and second guide rail during advancement of the conveyor belt and a second guide roller arranged for alternate contact with the third and fourth guide rails during advancement of the conveyor belt, and means for rotational supporting the first and second guide roller for rotation about a common axis.

BRIEF DESCRIPTION OF THE DRAWINGS

The above description, as well as further objects, features and advantages of the present invention will be more fully understood with reference to the following detailed description of a conveyor, when taken in conjunction with the accompanying drawings, wherein.

DETAILED DESCRIPTION

Figure 1:
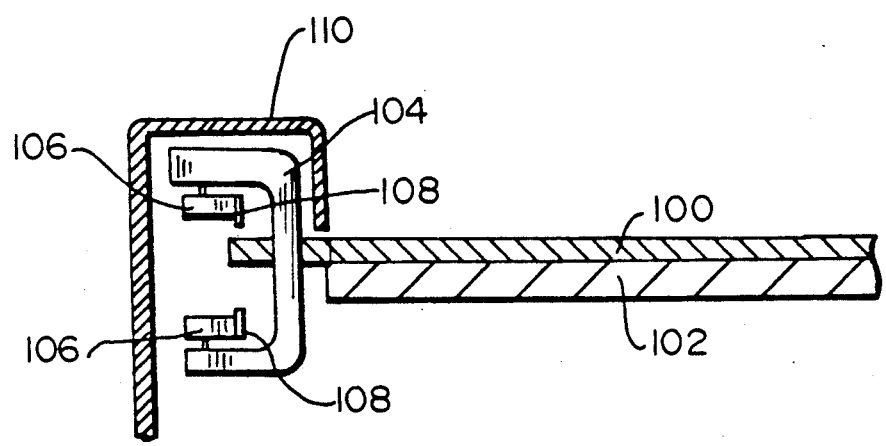
FIG. 1 is a schematic diagram in partial cross-section showing a counterbalance assembly for the curved section of an endless belt conveyor in accordance with the prior art.
Figure 2:
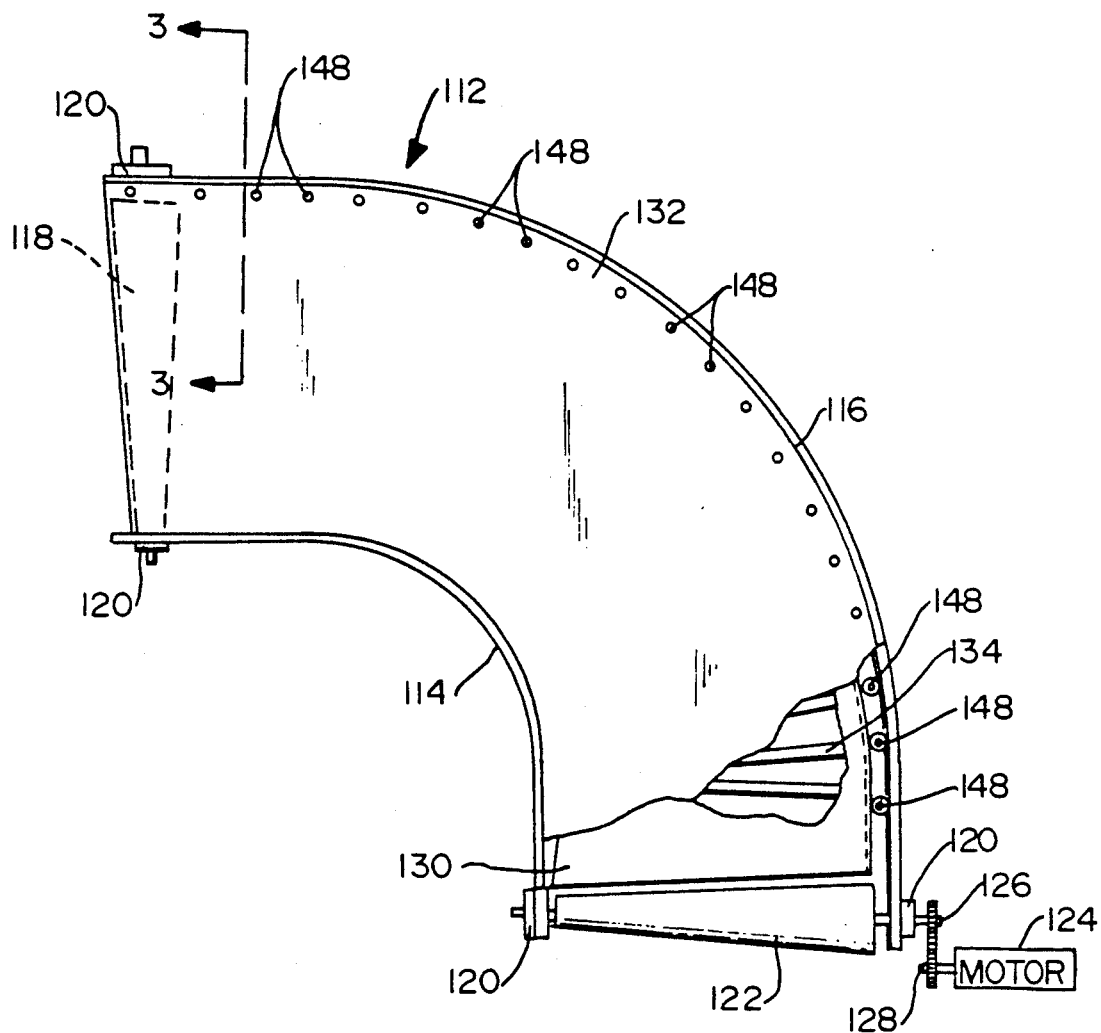
FIG. 2 is a plan view in partial cross-section showing a curved section of an endless belt conveyor having a counterbalance assembly constructed in accordance with the present invention.
Figure 3:
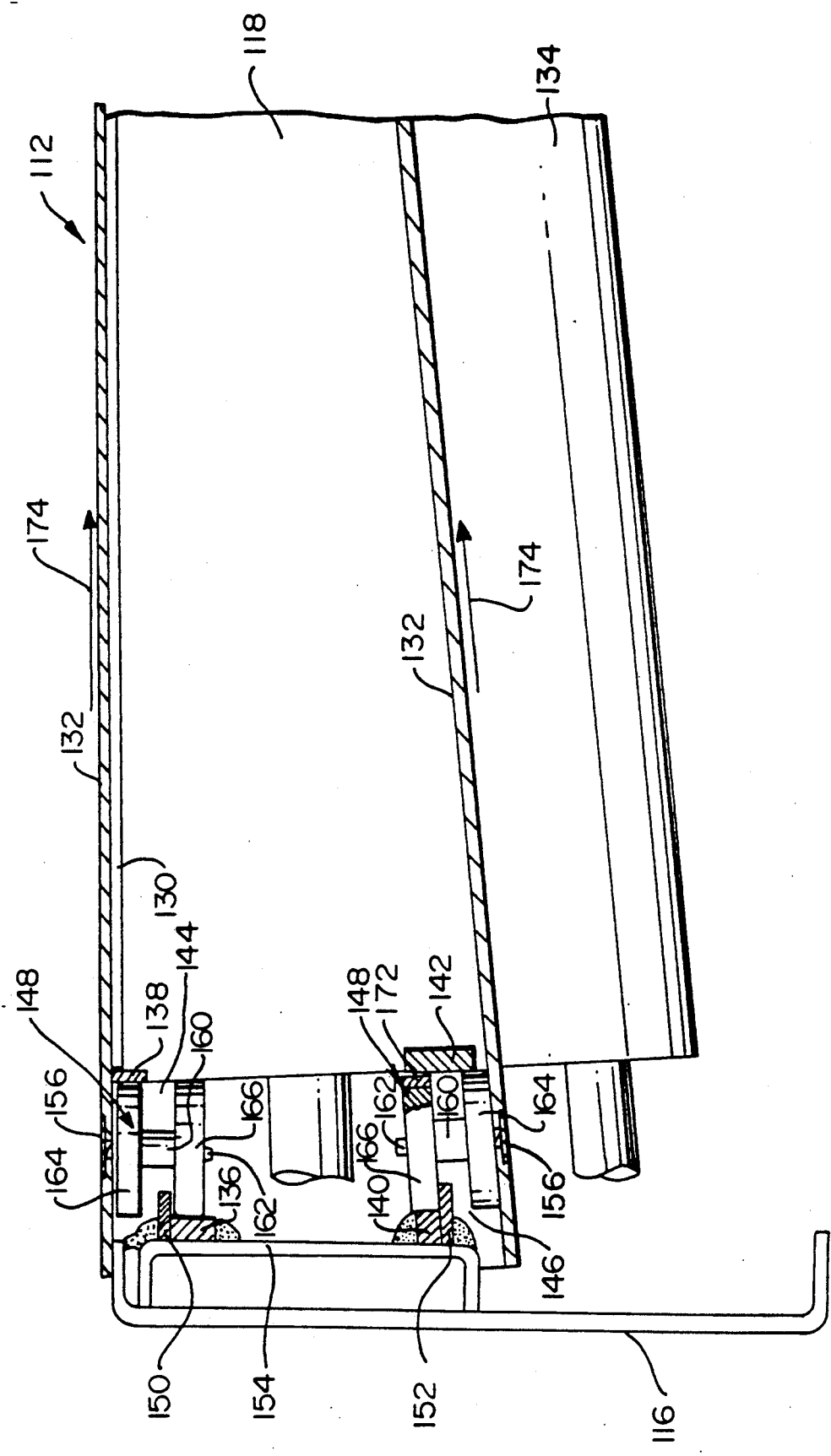
FIG. 3 is a partial cross-sectional view taken along line 3—3 in FIG. 2 showing in detail the construction and arrangement of the counterbalance assembly in accordance with the present invention.

Referring now to the drawings wherein like elements shown in different figures are represented by like reference numerals, there is shown in FIG. 2 a conveyor generally designated by reference numeral 112. The conveyor 112 is constructed in the nature of a power driven, endless belt curved section designed to carry articles along a curved path while maintaining the orientation of the article from one end of the conveyor to the other. The conveyor 112, as best shown in FIGS. 2 and 3, includes a curved inner frame 114 and a spaced apart curved outer frame 116. A conical shaped idler roller 118 is journaled for free rotation about its axis by known means between the inner frame 114 and outer frame 116, for example, by means of support bearings 120. In a similar manner, a conical shaped power roller 122 is journaled for free rotation about is axis by known means between the inner frame 114 and outer frame 116, for example, by means of support bearings 120. The power roller 122 is driven by means of a motor 124 coupled to the shaft 126 of the power roller through a gear and drive chain arrangement generally designated by reference numeral 128.

A planar slider bed 130 having a curved profile is supported horizontally between the upper portion of the inner frame 114 and outer frame 116. A flexible, endless belt 132 arranged in the form of a loop having a curved profile is arranged extending circumferentially about the idler roller 118 and power roller 122 between the inner frame 114 and outer frame 116. The upper portion of the endless belt 132 is supported by the slider bed 130. In turn, the lower portion of the endless belt 132 is supported by a plurality of support idler rollers 134 which are journaled for free rotation between the inner frame 114 and outer frame 116. From the aforedescribed construction of the conveyor 112, operation of motor 124 will cause the continuous advancement of the endless belt 132 across the surface of the slider bed 130 so as to advance articles being supported thereon from one end of the conveyor to the other.

The outer frame 116 includes an upper pair of guide rails 136, 138 arranged adjacent the upper portion of the endless belt 132 and a lower pair of guide rails 140, 142 arranged adjacent the lower portion of the endless belt. The first pair of guide rails 136, 138 are horizontally and vertically offset from each other and extend continuously along the length of the outer edge of the upper portion of the endless belt 132. Similarly, the lower pair of guide rails 140, 142 are horizontally and vertically offset from each other and extend continuously along the length of the outer edge of the lower portion of the endless belt 132. As a result of the spaced apart relationship between guide rails 136 and 138 and guide rails 140 and 142, there is formed an upper path 144 and a lower path 146, respectively, for receiving a plurality of guide assemblies 148.

An upper retaining rail 150 is arranged adjacent guide rail 136 underlying the upper portion of endless belt 132. Similarly, a lower retaining rail 152 is arranged adjacent guide rail 140 overlying the lower portion of the endless belt 132. The guide rails 136, 140 and upper and lower retaining rails 150, 152 are secured to a C-shaped bracket 154 forming a part of outer frame 116. In a similar manner, guide rails 138, 142 are secured within the outer frame 116 by means not shown.

Figure 4:
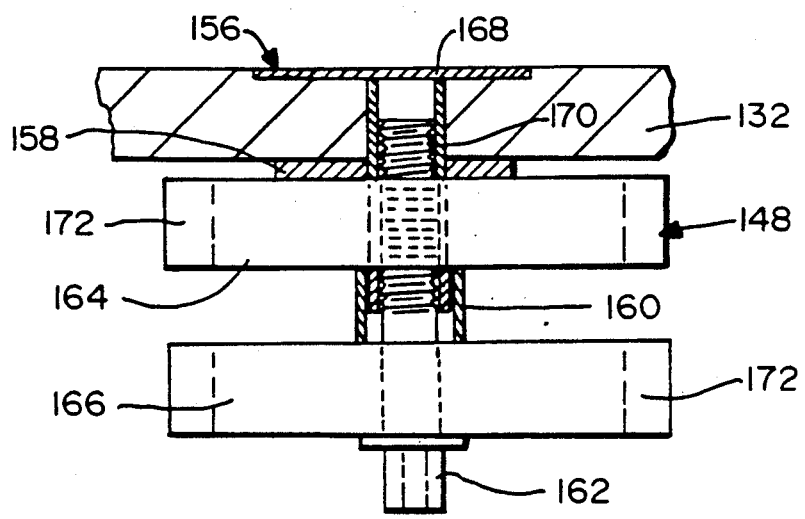
FIG. 4 is a partial cross-sectional view showing in greater detail the construction and arrangement of a portion of the counterbalance assembly as shown in FIG. 3.

Turning now to FIG. 4, the construction of the guide assemblies 148 will be described. The guide assembly 148 includes a T-nut 156, a flat washer 158 having a central opening, a cylindrical hollow spacer 160, an exterior threaded bolt 162 and a pair of guide rollers 164, 166. The T-nut 156 includes a flat circular disc 168 from which there transversely depends a hollow internally threaded tube 170. The peripheral portion of the outer edge of the endless belt 132 is provided with a plurality of holes sized to receive tube 170 and an enlarged surface recess sized to receive disc 168 upon insertion therein. The length of the tube 170 is such to extend beyond the thickness of the endless belt 132 a sufficient distance to receive the washer 158, guide roller 164 and at least a portion of the spacer 160.

In this regard, tube 170 extends through the opening in the washer 158 and rotationally supports by means of a central bearing (not shown) guide roller 164. The spacer 160 is positioned about the extended portion of tube 170 abutting guide roller 164. The second guide roller 166 is rotationally supported by means of a central bearing (not shown) about an unthreaded portion of bolt 162. The threaded portion of bolt 162 extends through spacer 160 and threadingly engages the internal threads within tube 170 of the T-nut 156 thereby holding the guide assembly 148 together. This construction of the guide assembly 148 enables the spaced apart guide rollers 164, 166 to rotate independent of each other about a common axis arranged substantially transverse to the surface of the endless belt 132.

The guide assemblies 148 are arranged on spaced apart centers, for example, approximately every 4 inches. The guide rollers 164, 166 are constructed from a steel core supporting a circumferentially arranged outer nylon tire 172. This selection of materials is particularly useful for conveyors having speeds of up to about 300 feet per minute with the guide rails 136, 138, 140, 142 being constructed from steel. For conveyors exceeding approximately 300 feet per minute, the guide rollers 164, 166 will be constructed entirely of steel thereby eliminating the nylon tire 172. In addition, the guide rails 136, 138, 140, 142 will be constructed from nylon material or constructed from a nylon face overlying a steel backing.

In assembled relationship, as best shown in FIG. 3, each guide assembly 148 is positioned in a general vertical orientation extending between the pair of upper guide rails 136, 138 and lower guide rails 140, 142. Guide roller 166 of the guide assembly 148 extending from the upper portion of the endless belt 132 has a circumferential portion extending underlying the projecting end of upper retaining rail 150. In a similar manner, guide roller 166 of the guide assembly 148 extending from the lower portion of the endless belt 132 has a circumferential portion arranged overlying the projection of the lower retaining rail 152. The guide assemblies 148 are dimensioned such that guide roller 164 has its circumferential edge surface adjacent guide rails 138, 142 for rolling contact therewith. Similarly, guide roller 166 is dimensioned such that its circumferential edge surface is arranged adjacent guide rails 136, 140 for rolling contact therewith. Based upon this construction, it is to be noted that no portion of the guide assembly 148 extends above the surface of the endless belt 132 so as to potentially interfere with articles being transported therealong. As such, large articles may actually extend beyond the width of the endless belt 132 and be conveyed without difficulty.

In operation, the endless belt 132 is advanced over the slider bed 130 by operation of motor 124 which rotates power roller 122 by means of the gear and drive chain arrangement 128. As the endless belt 132 is advanced, there is a tendency for the endless belt to drift radially inward in the direction indicated by arrows 174. The drifting of the endless belt 132 is prevented by the guide rollers 164 which, depending upon their location about the loop formed by the endless belt 132, contact either guide rail 138 or guide rail 142 which function as stops. It is contemplated that this restriction of the endless belt 132 might cause the guide assemblies 148 to have the tendency to tilt about their axis in a manner which will cause the outer peripheral portion of the endless belt 132 to lift away from the slider bed 130. This tilting action is prevented by the guide rollers 166 contacting either guide rail 136 or guide rail 140 depending upon the location of the guide assembly 148 as it is advanced through the upper and lower paths 144, 146. In other words, the guide rollers 164, 166 prevent the endless belt 132 from being displaced by functioning as a counterbalance so as to preclude the radial inward drifting of the endless belt as the guide assemblies 148 travel along the upper and lower paths 144, 146.

As a safety feature, the guide assemblies 148 are prevented from being pulled out from the upper and lower paths 144, 146 by the upper and lower retaining rails 150, 152. In this regard, the guide rollers 166 are restricted in vertical movement by their engagement with the projecting portion of the upper and lower retaining rails 150, 152.

Although the invention herein has been described with references to particular embodiments, it is to be understood that the embodiments are merely illustrative of the principles and application of the present invention. It is therefore to be understood that numerous modifications may be made to the embodiments and that other arrangements may be devised without departing from the spirit and scope of the present invention as defined by the claims.

What is claimed is:

1. A device for transporting articles along a curved path, said device comprising a conveyor belt arranged for travel over a curved path, said conveyor belt having an outer edge and an inner edge; a frame including spaced apart first and second guide rails; and a plurality of guide assemblies attached in spaced apart relationship to said conveyor belt and extending between said first and second guide rails, said guide assemblies including a first guide roller arranged for contact with said first guide rail and a second guide roller arranged for contact with said second guide rail, said first and second guide rails extending underlying said outer edge of said conveyor belt, and support means for rotationally supporting said first and second guide rollers for rotation about a common axis.

2. The device as set forth in claim 1, wherein said second guide rail is horizontally and vertically offset from said first guide rail.

3. The device as set forth in claim 1, wherein said first and second guide rollers extend entirely below the surface of said conveyor belt.

4. The device as set forth in claim 1, wherein said support means includes first and second elongated members joinable to effectively provide a shaft about which said first and second guide rollers are rotationally supported.

5. The device as set forth in claim 4, wherein said first member includes a T-nut having a hollow extension.

6. The device as set forth in claim 5, wherein said second member includes a threaded bolt engageable longitudinally within said hollow extension.

7. The device as set forth in claim 6, further including a spacer disposed between said first and second guide rollers and about a portion of said extension and said bolt.

8. The device as set forth in claim 1, wherein said common axis is arranged substantially transverse to the surface of said conveyor belt.

9. The device as set forth in claim 1, wherein said first and second guide rollers include a central metal core surrounded by an annular member of synthetic material.

10. The device as set forth in claim 1, further including a projecting rail overlying a circumferential portion of said second guide roller to prevent vertical displacement thereof.

11. A device for transporting articles along a curved path, said device comprising an endless conveyor belt arranged for travel over a curved path, said conveyor belt having a curved inner edge and a curved outer edge, said outer edge having a length greater than said length of said inner edge; a frame arranged adjacent said outer edge of said conveyor belt, said frame including a first guide rail and a second guide rail horizontally and vertically offset from said first guard rail; and a plurality of guide assemblies attached in spaced apart relationship along the curved outer edge of said conveyor belt and extending vertically between said first and second guide rails, said guide assemblies including a first guide roller arranged for contact with said first guide rail and a second guide roller arranged for contact with said second guide rail, said first and second guide rollers extending entirely below the surface of said conveyor belt, and support means for rotationally supporting said first and second guide rollers for rotation about a common axis arranged substantially transverse to said conveyor belt.

12. The device as set forth in claim 11, wherein said support means includes first and second elongated members joinable to effectively provide a shaft about which said first and second guide rollers are rotationally supported.

13. The device as set forth in claim 12, wherein said first member includes a T-nut having a hollow extension.

14. The device as set forth in claim 13, wherein said second member includes a threaded bolt engageable longitudinally within said hollow extension.

15. The device as set forth in claim 14, further including a spacer disposed between said first and second guide rollers and about a portion of said extension and said bolt.

16. The device as set forth in claim 11, wherein said first and second guide rollers include a central metal core surrounded by an annular member of synthetic material.

17. The device as set forth in claim 11, further including a projecting rail overlying a circumferential portion of said second guide roller to prevent vertical displacement thereof.

18. A device for transporting articles along a curved path, said device comprising an endless conveyor belt arranged in the form of a loop having an upper portion for conveying articles along a horizontal curved path and an underlying lower portion, said conveyor belt having a curved inner edge and a curved outer edge, said outer edge having a length greater than the length of said inner edge, means for advancing said upper portion of said conveyor belt along said curved path; a frame arranged adjacent the outer edge of said conveyor belt, said frame including an upper pair of guide rails arranged adjacent said upper portion of said conveyor belt between said upper and lower portions thereof and a lower pair of guide rails arranged adjacent said lower portion of said conveyor belt between said upper and lower portions thereof, said upper pair of guide rails including a first guide rail and a second guide rail horizontally and vertically offset from said first guide rail, said lower pair of guide rails including a third guide rail and a fourth guide rail horizontally and vertically offset from said third guide rail; and a plurality of guide assemblies attached in spaced apart relationship along the curved outer edge of said conveyor belt and alternately extending between said upper and lower pair of guide rails upon advancement of said conveyor belt, said guide assemblies including a first guide roller arranged for alternate contact with said first and second guide rail during advancement of said conveyor belt and a second guide roller arranged for alternate contact with said third and fourth guide rails during advancement of said conveyor belt, and means for rotational supporting said first and second guide roller for rotation about a common axis.

19. A device for transporting articles along a curved path, said device comprising a conveyor belt arranged for travel over a curved path; a frame including spaced apart first and second guide rails; and a plurality of guide assemblies attached in spaced apart relationship to said conveyor belt and extending between said first and second guide rails, said guide assemblies including a first guide roller arranged for contact with said first guide rail and a second guide roller arranged for contact with said second guide rail, and support means for rotationally supporting said first and second guide rollers for rotation about a common axis, said support means including first and second elongated members joinable to effectively provide a shaft about which said first and second guide rollers are rotationally support, said first member including a T-nut having a hollow extension.

* * * * *

UNITED STATES PATENT AND TRADEMARK OFFICE
CERTIFICATE OF CORRECTION

PATENT NO. : 5,038,925

DATED : August 13, 1991

INVENTOR(S) : Rodman W. Chrysler

It is certified that error appears in the above-identified patent and that said Letters Patent is hereby corrected as shown below:

Column 2, line 14, "belt 102" should read --belt 100--.
Column 2, line 15, "rotational" should read --rotationally--.
Column 2, line 38, "to permits" should read --to permit--.
Column 2, line 58, "rotational" should read --rotationally--.
Column 3, line 3, "guard rail" should read --guide rail--.
Column 3, line 10, "rotational" should read --rotationally--.
Column 3, line 45, "rotational" should read --rotationally--.
Column 4, line 20, "about is axis" should --about its axis--.
Column 6, line 16, "tiling" should read --tilting--.
Column 7, line 28, "guard rail" should read --guide rail--.
Column 8, line 38, "rotational" should read --rotationally--.
Column 8, line 55, "support" should read -- supported--.

Signed and Sealed this

Twenty-third Day of February, 1993

Attest:

STEPHEN G. KUNIN

Attesting Officer

Acting Commissioner of Patents and Trademarks